(12) United States Patent
Yu (10) Patent No.: US 7,541,082 B2
(45) Date of Patent: *Jun. 2, 2009

(54) CELLULAR STRUCTURE

(75) Inventor: Fu-Lai Yu, Taipei Heien (TW)

(73) Assignee: Teh Yor Co., Ltd., Taipei (TW)

( * ) Notice: Subject to any disclaimer, the term of this patent is extended or adjusted under 35 U.S.C. 154(b) by 47 days.

This patent is subject to a terminal disclaimer.

(21) Appl. No.: 11/484,397

(22) Filed: Jul. 11, 2006

(65) Prior Publication Data

US 2006/0251855 A1 Nov. 9, 2006

Related U.S. Application Data

(60) Continuation of application No. 11/166,453, filed on Jun. 24, 2005, now Pat. No. 7,074,475, which is a division of application No. 10/281,561, filed on Oct. 28, 2002, now Pat. No. 6,989,066.

(51) Int. Cl.
*B32B 3/12* (2006.01)
*B32B 33/00* (2006.01)
*B29C 65/00* (2006.01)

(52) U.S. Cl. .................... 428/116; D6/575; 156/197; 156/182

(58) Field of Classification Search ................ 428/116; 156/197, 182
See application file for complete search history.

(56) References Cited

U.S. PATENT DOCUMENTS

| 1,827,718 | A | 10/1931 | Whitney | |
|---|---|---|---|---|
| 2,201,356 | A | 5/1940 | Terrell | 156/16 |
| 3,055,419 | A | 9/1962 | Rubin et al. | 160/84 |
| 4,019,554 | A | 4/1977 | Rasmussen | 160/84 R |
| 4,288,485 | A | 9/1981 | Suominen | 428/116 |
| 4,307,768 | A | 12/1981 | Anderson | 160/84 R |
| 4,347,887 | A | 9/1982 | Brown | 160/368 R |
| RE31,129 | E | 1/1983 | Rasmussen | 156/193 |
| 4,388,354 | A | 6/1983 | Suominen | 428/12 |
| 4,450,027 | A | 5/1984 | Colson | 156/193 |

(Continued)

FOREIGN PATENT DOCUMENTS

DE    28 40 023  A1    3/1980

(Continued)

*Primary Examiner*—Jennifer McNeil
*Assistant Examiner*—Nicole T Gugliotta
(74) *Attorney, Agent, or Firm*—Olson & Cepuritis, Ltd.

(57) ABSTRACT

A cellular structure such as a honeycomb window treatment comprises a plurality of rows of elongated cells secured to one another. Each of the rows is constructed by providing a first longitudinally extending length of material, which includes a first surface and a second surface, as well as, a lesser width portion and a greater width portion. A second length of material is also provided that includes a first surface and a second surface of the first material. The second surface of the second material is secured to the first surface over the greater width portion of the first material along a plurality longitudinally extending locations on the second surface of the second material to form a row. A longitudinally extending crease may also be formed in the first material such that the lesser width portion and the greater width portion of the first material lie on opposite sides of the crease.

20 Claims, 5 Drawing Sheets

U.S. PATENT DOCUMENTS

| | | | |
|---|---|---|---|
| 4,631,108 A | 12/1986 | Colson | 156/461 |
| 4,631,217 A | 12/1986 | Anderson | 428/118 |
| 4,676,855 A | 6/1987 | Anderson | 156/200 |
| 4,677,012 A | 6/1987 | Anderson | 428/116 |
| 4,677,013 A | 6/1987 | Anderson | 428/116 |
| 4,685,986 A | 8/1987 | Anderson | 156/167 |
| 4,732,630 A | 3/1988 | Schnebly | 156/64 |
| 4,795,515 A | 1/1989 | Kao et al. | 156/197 |
| 4,849,039 A | 7/1989 | Colson et al. | 156/197 |
| 4,871,006 A | 10/1989 | Kao et al. | 160/84.1 |
| 4,885,190 A | 12/1989 | Schnebly | 427/207.1 |
| 4,984,617 A | 1/1991 | Corey | 160/84.1 |
| 5,002,628 A | 3/1991 | Schnebly | 156/379 |
| 5,015,317 A | 5/1991 | Corey et al. | 156/197 |
| 5,043,039 A | 8/1991 | Swiszcz | 156/197 |
| 5,090,098 A | 2/1992 | Seveik et al. | 29/24.5 |
| 5,097,884 A | 3/1992 | Sevcik et al. | 160/84.1 |
| 5,106,444 A | 4/1992 | Corey et al. | 156/197 |
| 5,129,440 A | 7/1992 | Colson | 160/84.1 |
| 5,160,563 A | 11/1992 | Kutchmarek et al. | 156/204 |
| 5,193,601 A | 3/1993 | Corey et al. | 160/84.1 |
| 5,228,936 A | 7/1993 | Goodhue | 156/260 |
| 5,482,750 A | 1/1996 | Colson et al. | 428/12 |
| 5,525,395 A | 6/1996 | Huang | 428/116 |
| 5,601,885 A | 2/1997 | Akins | 428/12 |
| 5,620,035 A | 4/1997 | Judkins | 160/84.05 |
| 5,630,900 A | 5/1997 | Huang | 156/227 |
| 5,654,073 A * | 8/1997 | Swiszcz et al. | 428/116 |
| 5,670,000 A | 9/1997 | Colson et al. | 156/197 |
| 5,691,031 A | 11/1997 | Swiszcz et al. | 428/116 |
| 5,702,552 A | 12/1997 | Kutchmarek et al. | 156/197 |
| 5,834,090 A * | 11/1998 | Huang | 428/116 |
| 5,837,084 A | 11/1998 | Barss | 156/197 |
| 5,974,763 A | 11/1999 | Colson et al. | 52/793.1 |
| 6,052,966 A | 4/2000 | Colson et al. | 52/793.1 |
| 6,066,382 A | 5/2000 | Swiszcz et al. | 428/116 |
| 6,302,982 B1 | 10/2001 | Corey et al. | 156/73.4 |
| 6,319,586 B1 | 11/2001 | Colson | 428/116 |
| 6,345,486 B1 | 2/2002 | Colson et al. | 52/793.1 |
| 6,377,384 B2 | 4/2002 | Corey et al. | 359/227 |
| 6,416,842 B1 | 7/2002 | Swiszcz et al. | 428/116 |

FOREIGN PATENT DOCUMENTS

| | | |
|---|---|---|
| EP | 0 220 924 | 5/1987 |
| EP | 0 380 271 | 8/1990 |
| EP | 0 427 477 A2 | 5/1991 |
| EP | 0 455 911 A1 | 11/1991 |
| GB | 2 236 551 A | 4/1991 |

* cited by examiner

CELLULAR STRUCTURE

CROSS-REFERENCE TO RELATED APPLICATIONS

This application is a continuation of application Ser. No. 11/166,453, filed Jun. 24, 2005, now issued as U.S. Pat. No. 7,074,475, which is a divisional of application Ser. No. 10/281,561, filed Oct. 28, 2002, now issued as U.S. Pat. No. 6,989,066, both by Fu-Lai Yu, which is hereby incorporated by reference.

TECHNICAL FIELD OF THE INVENTION

The present invention relates to an expandable cellular structure such as used in honeycomb window shades, having a plurality of parallel elongated cells.

BACKGROUND OF THE INVENTION

Expandable cellular structures that are often used as honeycomb window shades consisting of a plurality of elongated tubular cells are well known in the art. Honeycomb window shades provide consumers with numerous advantages in window coverings such as improved insulation, light filtering, and aesthetic appeal. The present invention relates to cellular structures and a method for making the cellular structures that utilizes a novel system of cutting, folding, gluing and arranging strips of fabric material in the construction of honeycomb panels.

The cells within such cellular honeycomb structures are constructed of a flexible material with each cell extending across the width of the structure and in a parallel relationship to the other cells. The volume occupied by each cell is decreased or expanded, respectively, by collapsing the cells together or spreading them apart. The expandable attributes of the cells provides a useful structure for covering areas of various sizes.

Many of the current cellular structures have pleats extending along the length of each cell. The pleats are generated by placing creases in the material during cell fabrication. The pleats assist in the orderly collapsing of individual cells as the structure is compressed. The pleats also result in the face and back of the structure having a corrugated appearance which is similar to that of an accordion.

One shortcoming experienced with standard honeycomb shade constructions that results in an undesired aesthetic appearance is due to the way honeycomb shades achieve their shape. Typically, honeycomb blinds are comprised of creased and folded lengths of material. The folded lengths of materials have a spring coefficient that prevents the folded material from completely stretching out, and thereby maintaining the pleated or honeycombed appearance.

Because the structure of the honeycomb structure is based on the spring coefficient of the material, however, the overall appearance of a conventional honeycomb panel is affected by the varying amount of weight supported by any particular cell of the honeycomb panel. Cells of the honeycomb panel that are located towards the top of the shade must support the weight of all the material below it and are stretched much more than cells located towards the bottom of the shade, which have less weight to support. As such, the predominance of the pleats emanating from those cells towards the top of the structure will gradually diminish as the amount of weight being supported by each cell increases. Thus, the cellular structure will fail to provide a uniformly distributed pleated appearance. The top cells will appear almost flat while the bottom cells will remain substantially pleated. The result of this is an uneven appearance and uneven shading ability of the blind. Over time, the cells towards the top of a shade may also be stretched such that the material loses its ability to retain a creased or pleated appearance.

The inability of a typical honeycomb cellular structure to limit the extent particular cells may be stretched also results in a waste of material. This is because with conventional honeycomb constructions a balance must be achieved with the cellular structure such that cells towards the top of the shade are not overly distorted while still allowing cells towards the bottom of the shade to extend sufficiently to provide a desirable aesthetic appearance. Often, a compromise is made such that honeycomb cells towards the bottom of a shade are not fully extended by a heavier weight to prevent cells at the top of the shade from being too stretched out. As a result, more cells will be needed to cover a window space than would be necessary if cells at the bottom of the shade could be fully extended. As a result, the material costs of providing additional rows of honeycomb cells than would otherwise be necessary to cover a window are increased.

Another shortcoming presented by most cellular honeycomb window shades is due to the fact that they are made with a single type of material is used throughout the window shade. This lack of flexibility in the ability to choose from different fabrics to provide different coloring, shading, and insulation combinations is simply not possible with shades constructed from a single type of material.

Accordingly, what is needed is a cellular structure as used in a honeycomb window shade that preferably maintains its pleated appearance from top to bottom when it is fully extended. The cellular structure of the window shade should be designed such that the cells collapse repeatably the same way to provide for a uniform and desirable appearance. What is further desired is a method of making a cellular honeycomb structure, wherein the shade constructed limits the amount any particular cell may be stretched and enables all the cells to be fully extended and provide a uniform appearance without the shortcomings of typical honeycomb blind structures. What is further desired is a window shade that offers the flexibility to choose different combinations of types of material for the shade. The present invention meets these desires.

SUMMARY OF THE INVENTION

The present invention relates to a cellular structure such as used in honeycomb window shades having a uniformly pleated outer surface on its face and back, and a method for making the cellular structure. The structure has an aesthetically pleasing pleated appearance which is not lost over an extended period of time. Each cell along the outer visible surface of the structure will preferably have a uniform shape and size when the shade is fully extended.

A cellular structure is constructed by securing a plurality of rows comprising elongated cells to one another. In a preferred form of the invention discussed in further detail below, each row forms one cell, and then cooperates with adjacent rows to define other cells. Each of the plurality of rows is constructed by providing a first longitudinally extending length of material. This first material includes a first surface and a second surface. The first material also defines a lesser width portion and a greater width portion. A longitudinally extending fold or crease is formed in the first material such that the crease is located between the lesser width portion and the greater width portion.

A second longitudinally extending length of flat material is also provided for each row. The second material has a first surface and a second surface. The second material is secured via its second surface to the first surface of the first material by along at least one longitudinal location. Preferably, the second material also comprises a first minor width and a first major width. To form one of the plurality of rows of the cellular structure, the second surface of the second material is preferably secured to the first surface of the first material on the greater width portion along a plurality of longitudinally extending locations on the second surface of the second material. These longitudinally extending locations are preferably defined by glue or adhesive lines.

In a preferred embodiment, the lesser width portion of the first material is preferably greater than one-quarter of the total width of the first material. The greater width portion further comprises a second minor width and a second major width. The greater width portion is made up of the remainder of the first material. A fold or crease is formed between the lesser width portion and greater width portion. The lesser width portion of the first material is folded over the first surface of the first material on the greater width portion. In one embodiment, this folding process causes the lesser width portion to lie essentially on top of and parallel to the greater width portion. Alternatively, since the lesser width portion will not be adhered to the greater width portion, the lesser width portion may alternatively be folded such that an angle is formed between the lesser width portion and greater width portion that is less than 90 degrees, and does not lie on top of the greater width portion.

The second length of material is preferably secured to the first material to form a row such that an outer edge of the greater width portion of the first material and an outer edge of the second material are coterminous. In other words, the outer edge of the greater width portion of the first material and the outer edge of the second material preferable form an even edge for the row. The second material is preferably secured to the first material by two glue lines positioned at opposite edges of the second material after the first material has been folded. Alternatively, the second material may be secured to the first material prior to or at substantially the same time as the creasing and folding of the first material.

Each row is stacked with other rows, and each of the plurality of rows is secured to one or more adjacent rows. If a row is to be the top or bottom row of a shade, then it will only be secured to one adjacent row, and will be secured to either a head rail or a bottom rail. Otherwise, each row will have two adjacent rows to which it must be secured. Rows are secured such that the lesser width portion of the first material and the second material of one row is secured to the second surface of the greater width portion of the first material of an adjacent row.

To secure two rows together, it is preferred that two glue lines are sandwiched between the completed rows. One glue line secures the second side of the first material on an edge of the lesser width portion to the second side of the first material of an adjacent row. A second glue line also secures the first surface of the second material to the second side of the first material of an adjacent row. This second glue line is preferably placed between the first minor width and the first major width.

In a preferred form of the present invention, the first major width is greater than the first minor width. The first major width will face the outside or visible portion of the shade, such as the face or back of the shade, whereas the first minor width will be in the interior of the cellular structure and not noticeably visible once the shade is completed. As explained further below, the first major width will form part of the visible portion of the shade having a pleated appearance.

Although the way pieces of material and rows are secured together discussed thus far has been glue lines, the manner of securing the different fabric materials and completed rows together may be accomplished by any appropriate means. Examples of such techniques known in the art include bonding with glue or adhesive, ultrasonic welding, and knitting.

Once joined, the completed rows cooperate to define a vertically-collapsible double honeycomb fabric structure wherein each row has two alternatingly staggered columns of cells. The amount the honeycomb shade may be stretched or extended during normal use is limited such that when fully extended, the cells towards the top of the shade will have substantially the same configuration as the cells towards the bottom of the shade to provide even shading and an aesthetically enhanced appearance. The way in which each cell of the cellular structure may be limited as to how much it can be stretched when the window shade is opened is now discussed in further detail.

The cellular structure may be limited by a combination of two cooperating parts. The first part is the first minor width. The first minor width is the portion of the second material that, when the cellular structure is completed, will form part of the interior wall of the cells. The width of this first minor width is less than half the total width of the second material. The remainder of the second material is the first major width. Preferably, the location along the second material at which the second material is secured to an adjacent row is at the intersection of the first major width and the first minor width.

The second part of the limiting combination of parts is the second minor width portion of the first material. Preferably, the second minor width is the portion of the greater width portion of the first material extending from the position at which the first material is secured to the inner edge of the second material to the position at which the second surface of the first material is secured to an adjacent row. The second minor width is preferably the same width as the first minor width, and cooperates with the first minor width to complete an interior cell wall. The portion of the first material between the position at which the second surface of the first material is secured to an adjacent row to the outer edge of the first material is the second major portion.

This first combination of parts, the limiting combination that limits the amount cells can be extended, is made up of the first minor width and the second minor width. The width of this first combination is shorter than a second combination, which is made up of a first major width and the second major width. As such, when the cells are extended, the first combination of any particular row will reach the limit to which the row may be stretched and the aggregate of first combinations will act to limit the extension of the overall cellular structure. Meanwhile, the second combination of each row remains flexed, thereby maintaining a pleated appearance. In other words, when the first combination is fully extended the first minor width and second minor width will form a substantially coplanar structure. Since the second combination is longer than the first combination, the second combination will not be fully stretched, and thereby, form an angle and maintain a pleated appearance.

It is contemplated that, if desired, the second material may be a different material from the first material. For example, the second material may be of a different color, or may have different light transmission properties.

Other features and advantages of the present invention will become readily apparent from the following detailed description, the appended drawings, and the accompanying claims.

DESCRIPTION OF THE PREFERRED EMBODIMENT OF THE INVENTION

The invention disclosed herein is, of course, susceptible of being embodied or conducted in many different manners. Shown in the drawings and described herein below in detail are preferred embodiments of the invention. It is to be understood, however, that the present disclosure is an exemplification of the principles of the invention and does not limit the invention to the illustrated embodiments. Moreover, it is understood that the figures herein do not necessarily show details of the cellular structure made according to the present invention that are known in the art and that will be recognized by those skilled in the art as such. The detailed descriptions of such steps or elements such as the structure of the apparatus for cutting the shade material, the attachment of head rails and bottom rails, the curing process for adhesives that may be used, or the stacking apparatus are not necessary to an understanding of the invention. Accordingly, such steps or elements are not depicted herein.

Figure 1:
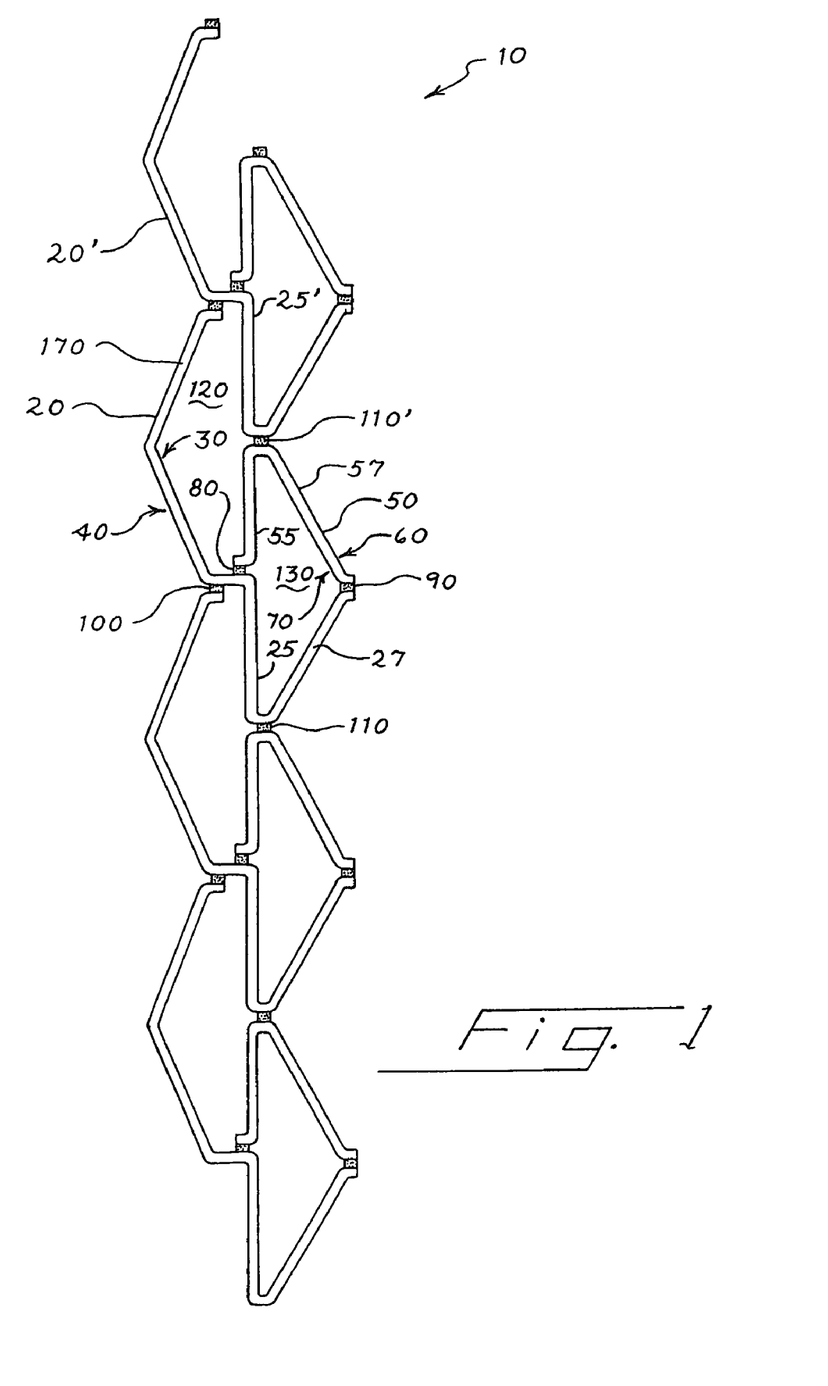
FIG. 1 is a foreshortened cross sectional schematic view of a fully opened embodiment of a honeycomb panel constructed according to the present method.
Figure 1A:
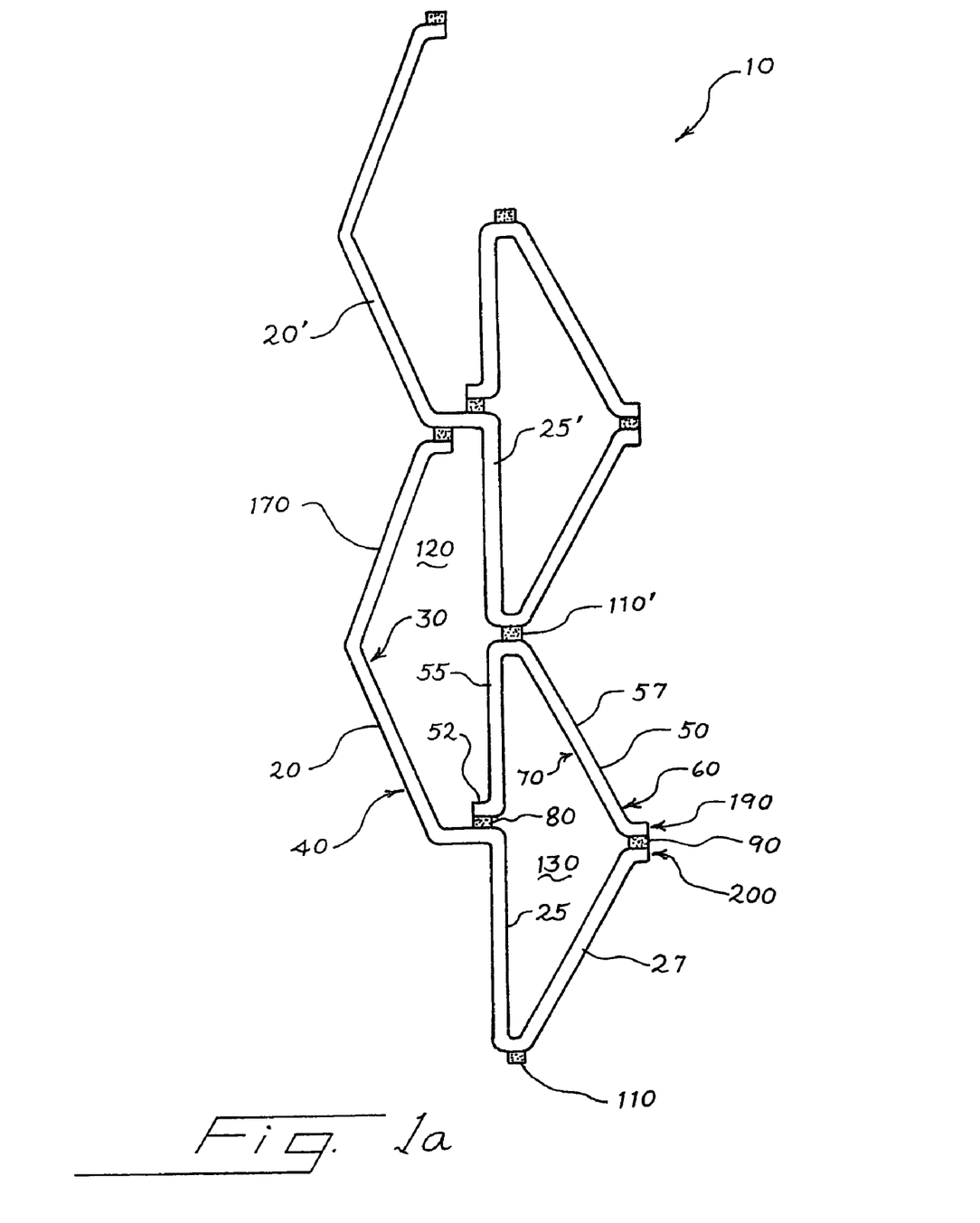
FIG. 1a is a closeup view of two rows of the cross sectional schematic of FIG. 1.

Referring to FIG. 1 and FIG. 1a, in accordance with a preferred embodiment of the present invention, a cross sectional view of a fully stretched or extended window shade 10 having a honeycomb cellular structure is shown. As shown, the window shade 10 is comprised of several rows, each row including a number of components. One component is a first material 20, which is a longitudinally extending length of material. The first material has a first surface 30 and a second surface 40. Another part forming the window shade 10 is a second material 50, which is also a longitudinally extending length of material. The second material also has a first surface 60 and a second surface 70. Preferably, in construction, second material 50 is the same type of material as first material 20. It is possible however, to utilize a different type or color of material for first and second materials 20, 50 to create different textures, qualities, transparency, or appearances for the overall window shade 10.

Second material 50 is secured to first material 20 along longitudinally extending areas, preferably by glue lines 80, 90. When second material 50 is secured to first material 20 a row is formed defining one complete cell 130, and approximately one-half of another cell 120.

Figure 4:
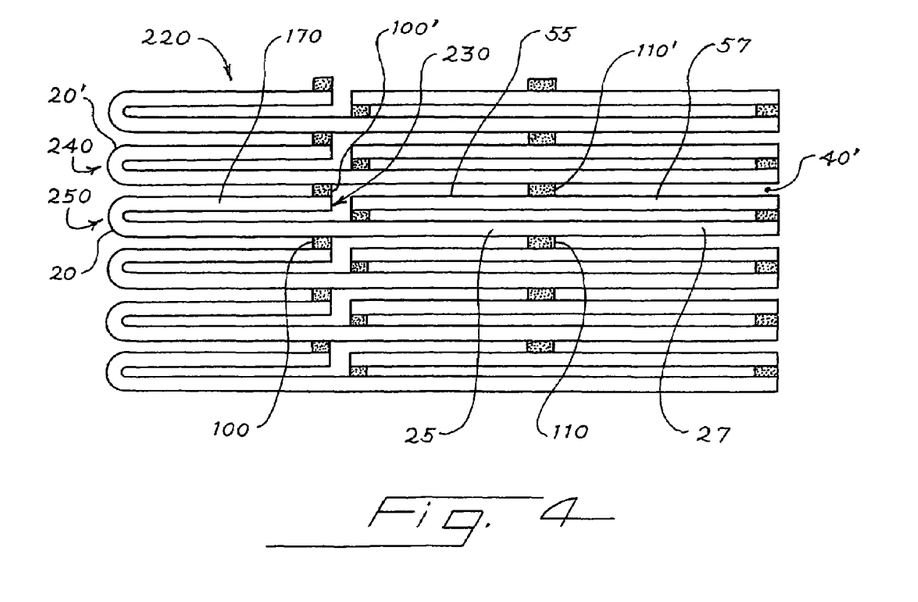
FIG. 4 is a cross sectional schematic view of a stack of completed rows.

Rows, such as rows 240 and 250 as shown in FIG. 4, are stacked and adjacent rows secured to one another to create the desired number of rows for window shade 10. As shown, rows are secured to the stack 220 at longitudinally extending areas, preferably by glue lines. For example row 250 is added to stack 220 and secured by glue lines 100, 110. As shown in FIGS. 1 and 4, the plurality of rows that are secured together, such as rows 240 and 250, cooperate to complete a cell of an adjacent row. For example, as shown in FIG. 1, a third material, such as the first material 20' of an adjacent row, cooperates with first material 20 and second material 50 to form cell 120.

The rows, when fully extended, define a vertically-collapsible double honeycomb cellular structure having two staggered columns of cells. The amount any particular cell of the cellular structure may be stretched or extended during normal use is limited such that when fully extended, the cells towards the top of the shade will have substantially the same configuration as the cells towards the bottom of the shade to provide even shading and enhanced aesthetic appeal. For example, as discussed in further detail below, cell 130 is limited as to how much it can be extended by the limiting combination made from a portion of the first material 20 and a portion of second material 50.

Cell 130 is limited as to how much it can be extended by a first or limiting combination of first minor width 55 of the second material 50 and second minor width 25 of the first material 20. As shown in FIG. 1a, the first minor width 55 is the distance along second material 50 from an inner edge 52 to glue line 110'. First minor width 55 has a width that is less than half the total width of second material 50. The second minor width 25 is the distance along first material 20 from glue line 80 to glue line 110. The second minor width 25 is preferably the same width as the first minor width 55. This first or limiting combination will be shorter than a second combination, which is made up of a first major width 57 and the second major width 27. The first major width 57 is shown as the distance along second material 50 from the outer edge 190 of the second material 50 to glue line 110'. The second major width 27 is shown as the distance along the first material 20 from the outer edge 200 of the first material 20 to glue line 110. The first combination, which is shorter than the second combination, will act to limit the extension of cell 130. When the first combination is fully extended the first minor width 55 and second minor width 25 will form a substantially coplanar structure. Since the second combination is longer than the first combination, the second combination will not be fully stretched and first major width 57 and second major width 27 will form and angle and maintain a pleated appearance.

The extent to which cell 120 may be stretched is similarly limited. Cell 120 is limited by the combination of first minor width 55 and a second minor width 25' of an adjacent row. The outer portion of cell 120 is shown as being made up of a portion of the first material 20. This includes the lesser width portion 170 and a corresponding width of greater width portion 180. Preferably, lesser width portion 170 will be of substantially equal width to the first major width 57 of the second material 50 and the second major width 27 of the first material 20. As such, the outer portion of cell 120 will not be fully extended when first minor width 55 and second minor width 57' are extended, and maintain a pleated appearance.

Figure 2:
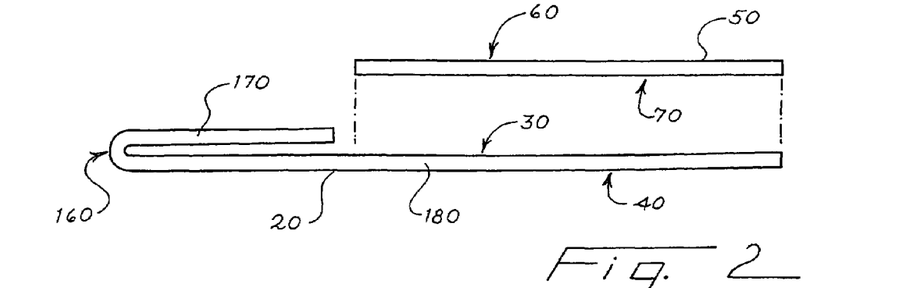
FIG. 2 is a cross sectional schematic view of first and a second longitudinally extending lengths of material.
Figure 3:
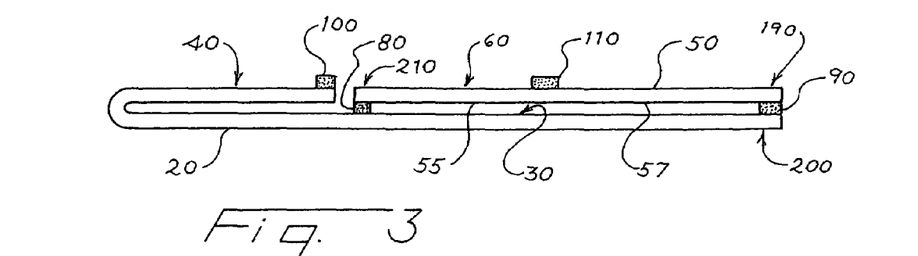
FIG. 3 is a cross sectional schematic view of a completed row.

Referring now to FIGS. 2 through 4, one preferred method of making the honeycomb window blind 10 is explained. As shown in FIG. 2, a first material 20 having a first surface 30 and a second surface 40 is creased and folded. Crease 160 is made between lesser width portion 170 and greater width portion 180 of first material 20. Lesser width portion 170 is folded over greater width portion 180 such that lesser width portion 170 lies on and partially over the first surface 30 of greater width portion 180. Preferably, crease 160 is made such that the lesser width portion 170 is greater than one-quarter the total width of first material 20. Alternatively, one can first adhere second material 50 to first material 20 and then fold first material 20.

A second material 50 is also provided as shown in FIG. 2. Second material 50 is preferably of a width that is less than one-half the total width of first material 20. In this embodiment of the present method, second material 50 is not creased or folded prior to assembly of the window shade 10. As shown in FIG. 3, it is preferred that a pair of glue lines 80 and 90 are applied to the first surface 30 of first material 20 before securing second material 50 to first material 20, and are located such that the outer edge 190 of second material 50 is secured at or near the outer edge 200 of first material 20, and such that the second surface 70 of second material 50 is secured to the first surface 30 of first material 20 at the inner edge 52 of the second material 50. It is most preferred that outer edge 200 of first material 20 and outer edge 190 of second material 50 are coterminous such that the outer edge 200 of first material 20 and outer edge 190 of second material are even.

After a row is completed as shown in FIG. 3, it is stacked with and secured to other completed rows such as shown in FIG. 4. Prior to a row being added to a stack 220, such as row 250, glue lines 100 and 110 are preferably applied to stack 220. These glue lines are preferably placed as shown in FIGS. 3 and 4. For example, a first glue line 100 is applied longitudinally on the second surface 40 of the first material 20 on the lesser width portion 170. A second glue line 110 is applied longitudinally to the first surface 60 of the second material 50. As discussed, the glue line 110' defines first major width 57 and first minor width 55 of the second material 50. Glue line 110 similarly defines second major width 27 and second minor width 25 of the first material 20.

As a row, such as row 240 shown in FIG. 4, is added to the stack 220, the row is adhered to the stack by way of the second surface 40' of the first material 20' by glue lines 100' and 110'. Glue line 100' is also preferably located near an edge 230 of the lesser width portion 170. After the desired number of rows are added, the stack 220 is taken to a curing station (not shown) to permanently join together the first and second materials, 20, 50 for each of the completed rows, as well as to permanently join the rows.

Figure 5:
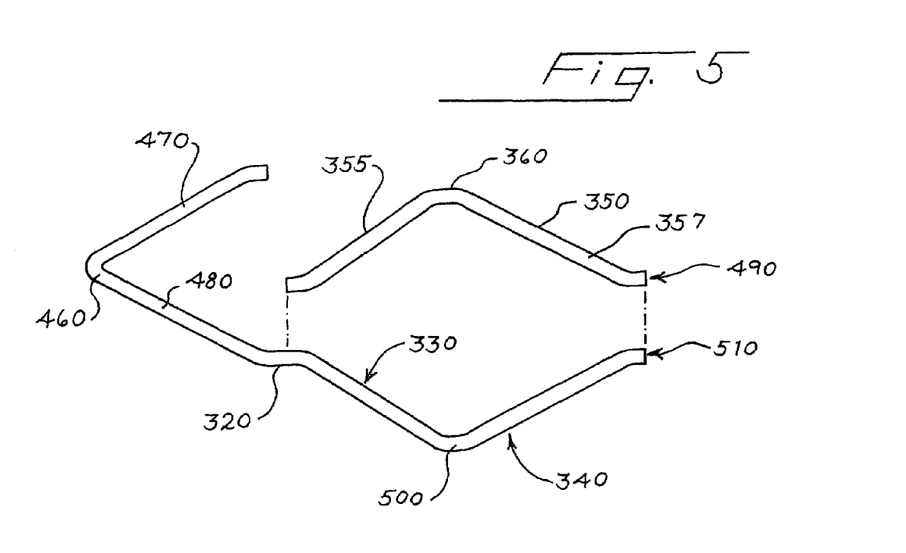
FIG. 5 is a cross sectional schematic view of an alternative embodiment of first and a second longitudinally extending lengths of material.
Figure 6:
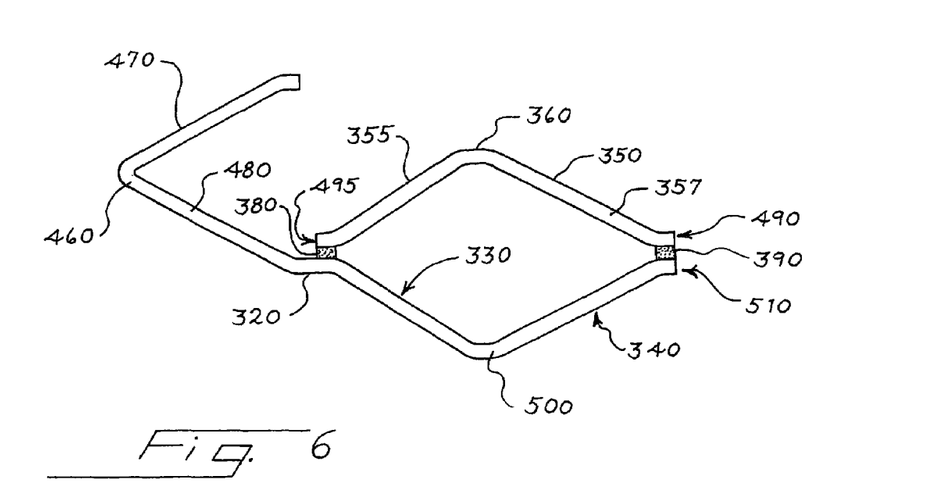
FIG. 6 is a cross sectional schematic view of a completed row constructed according to the alternative embodiment.

As an alternative method for constructing a window shade 10 with honeycomb structure, reference is made to FIGS. 5 and 6. In this embodiment, a first material 320 having a first surface 330 and a second surface 340 is creased and folded. Similar to the previous embodiment, crease 460 is made between a lesser width portion 470 and a greater width portion 480 of first material 320. Lesser width portion 470 is folded over greater width portion 480 such that an angle is formed between lesser width portion 470 and greater width portion 480 that is less than 90 degrees. Crease 460 is located between lesser width portion 470 and greater width portion 480 such that the lesser width portion 470 is more than one-quarter the total width of first material 320. A second crease 500 is also formed in the first material 320. Preferably, the distance from crease 500 to the outer edge 510 of first material 320 is equal to the lesser width portion 470 of first material 320.

A second material 350 is also provided. Second material 350 is preferably of a width that is less than one-half the total width of first material 320. In this embodiment of the present method, second material 350 is folded to form crease 360 prior securing second material 350 to first material 320. Crease 360 is preferably formed between a first major width 357 and a first minor width 355 of the second material 350. It is preferred that prior to securing second material 350 with first material 320, that a pair of glue lines 380 and 390 are applied to the first surface 330 of first material 320, which are located such that the outer edge 490 of second material 350 is secured at or near the outer edge 510 of first material 320, and such that the inner edge 495 of second material 350 is secured to the first surface 330 of first material 320. Preferably, the outer edge 490 of second material 350 is coterminous with the outer edge 510 of the first material 320.

The stacking of the completed row according to this second embodiment is essentially the same as described with the first embodiment. After the desired number of rows have been stacked, the adhesive may be cured and the appropriate bottom rail and head rails attached. The extent to which the completed structure may be stretched in this embodiment is limited essentially in the same manner as discussed above.

As yet another method of assembling the described honeycomb structure, one may take first material 20 and form a crease in first material 20 as described. First material 20 can then be stacked. A second material 50 can then be secured to first material 20 while first material 20 is in the stack as described above. Another first material 20 can then be secured to the top of the stack. Another second material 50 can then be secured to the stack. In other words, instead of completing a row and then stacking additional completed rows, stacking the pieces of material that make up the rows is done while the rows are being constructed.

Figures 7A, 7B, 7C, 7D:
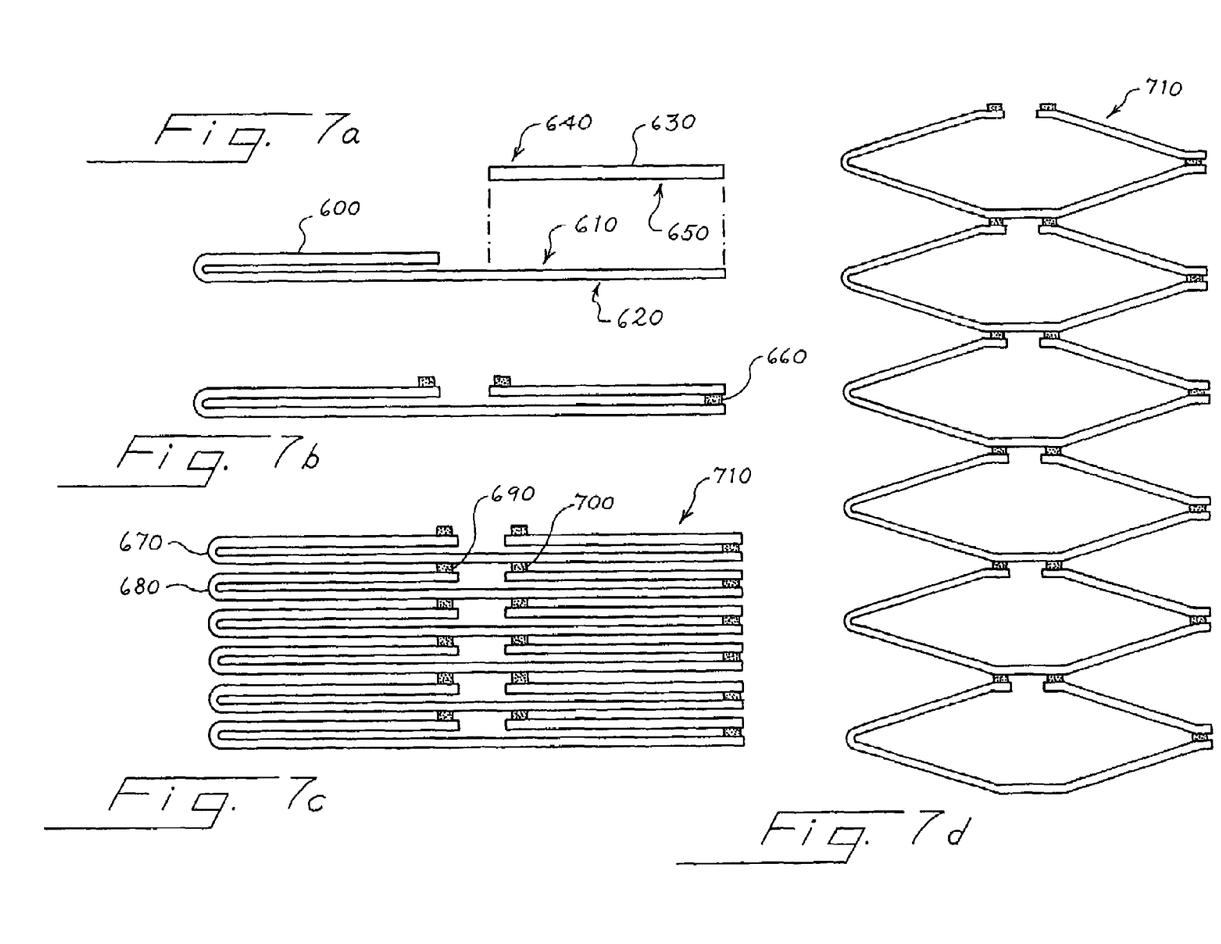
FIG. 7a is a cross sectional schematic view of an alternative embodiment of first and a second longitudinally extending lengths of material.
FIG. 7b is a cross sectional schematic view of an alternative embodiment of a completed row.
FIG. 7c is a cross sectional schematic view of an alternative embodiment of a stack of completed rows.
FIG. 7d is a foreshortened cross sectional schematic view of an alternative embodiment of an opened embodiment of a honeycomb panel constructed according to the alternative method.

Shown in FIGS. 7a-7d is another embodiment of the claimed invention. As shown in FIG. 7a, a first material 600 having a first surface 610 and a second surface 620 is provided. A second material 630 having a first surface 640 and second surface 650 is also provided. As shown in FIG. 7b, the first material 600 and the second material 630 are bonded together with glue line 660. As shown in FIG. 7c, similarly formed rows are stacked and secured together to form the cellular honeycomb structure 710. For example, row 670 is secured to row 680 via glue lines 690 and 700. FIG. 7d shows the cellular structure 710 in an expanded form.

What is claimed is:

1. A cellular structure such as for a honeycomb window treatment, the cellular structure comprising:
   a plurality of rows defining at least a first column and a second column of elongated cells, each of the plurality of rows comprising;
   (a) a longitudinally extending first material having a first surface and a second surface, the first material further including a lesser width portion and a greater width portion, whereby the lesser width portion extends over a first part of the greater width portion;
   (b) a longitudinally extending second material having a first surface and a second surface, whereby the second surface of the second material is secured to the first surface of the first material on the greater width portion at spaced regions, the second material being of a lesser width than the first material;

at least one cell of the first column including the lesser width portion and the greater width portion of the first material;

at least one cell of the second column including the second material and the greater width portion of the first material;

the plurality of rows, comprising a first row and a second row being arranged in a stack; and the first row being secured to at least the second row such that the lesser width portion of the first material of the first row and the second material of the first row are secured to a second surface of a first material of the second row.

2. The cellular structure of claim 1, wherein the second surface of the second material is secured to the first surface of the first material on the greater width portion by a plurality of glue lines.

3. The cellular structure of claim 1, wherein the second surface of the second material is secured to the first surface of the first material on the greater width portion by a pair of glue lines.

4. The cellular structure of claim 1, further comprising a longitudinally extending crease in the first material between the lesser width portion and the greater width portion.

5. The cellular structure of claim 4, whereby the first material comprises a second crease in the greater width portion of the first material and the second material further comprises a third crease.

6. The cellular structure of claim 1, whereby an outer edge of the second material is coterminous with an outer edge of the first material.

7. The cellular structure of claim 6, wherein the second surface of the second material is secured to the first surface of the first material proximate the outer edge of the second material.

8. The cellular structure of claim 1, whereby a first combination of a first minor width of the second material and a second minor width of the greater width portion of the first material is shorter than a combination of a first major width of the second material and a second major width of the greater width of the first material, such that when the cellular structure is fully extended the first combination is substantially coplanar, whereas the second combination defines a bend.

9. The cellular structure of claim 8 wherein the first minor width and the second minor width are substantially of equal width.

10. The cellular structure of claim 8, wherein the second major width and the lesser width portion are substantially of equal width.

11. The cellular structure of claim 1, wherein the first column of cells is vertically offset from the second column of cells.

12. The cellular structure of claim 1, wherein the at least one cell of the first column includes the lesser width portion and a second part of the greater width portion of the first material.

13. A cellular structure such for as a honeycomb window treatment, the cellular structure comprising:

a plurality of rows defining elongated cells, wherein each row includes a limiting member to restrict the extent to which the cells can be stretched, each of the plurality of rows further comprising:

a first material having a first surface and a second surface, the first material further including a lesser width portion and a greater width portion whereby the lesser width portion is overlapped with part of the greater width portion;

a second material having a first surface and a second surface, whereby the second surface of the second material is secured to the first surface of the first material on the greater width portion, the second material being of a lesser width than the first material;

the limiting member formed by a combination of a first minor width of the second material and a second minor width of the first material;

the plurality of rows, comprising a first row and a second row being arranged in a stack; and the first row being secured to at least the second row such that the lesser width portion of the first material of the first row and the second material of the first row are secured to the second row of the first material on the second surface.

14. The cellular structure of claim 13, wherein the second surface of the second material is secured to the first surface of the first material on the greater width portion by at least one glue line.

15. The cellular structure of claim 13, further comprising a longitudinally extending crease in the first material between the lesser width portion and the greater width portion.

16. The cellular structure of claim 15, whereby the first material comprises a second crease in the greater width portion of the first material, and the second material further comprises a third crease.

17. The cellular structure of claim 13, whereby an outer edge of the second material is coterminous with an outer edge of the first material.

18. The cellular structure of claim 13, wherein the first minor width and the second minor width are substantially of equal width.

19. The cellular structure of claim 13, wherein the rows define at least two columns.

20. A dual column cellular structure suitable for use in a window covering, the cellular structure comprising:

a first row comprising a first material having a greater width portion and a lesser width portion positionable over a first surface of the greater width portion, and a second material secured to the first surface of the greater width portion, the second material being of a lesser width than the first material;

a second row comprising a third material;

the lesser width portion of the first material of the first row being secured to the third material whereby the first material and the third material form a complete cell of a first column; and the second material being secured to the third material whereby the second material and the first material form a complete cell of a second column.

* * * * *